J. J. DEAL.
Cultivator.
No. 223,713. Patented Jan. 20, 1880.
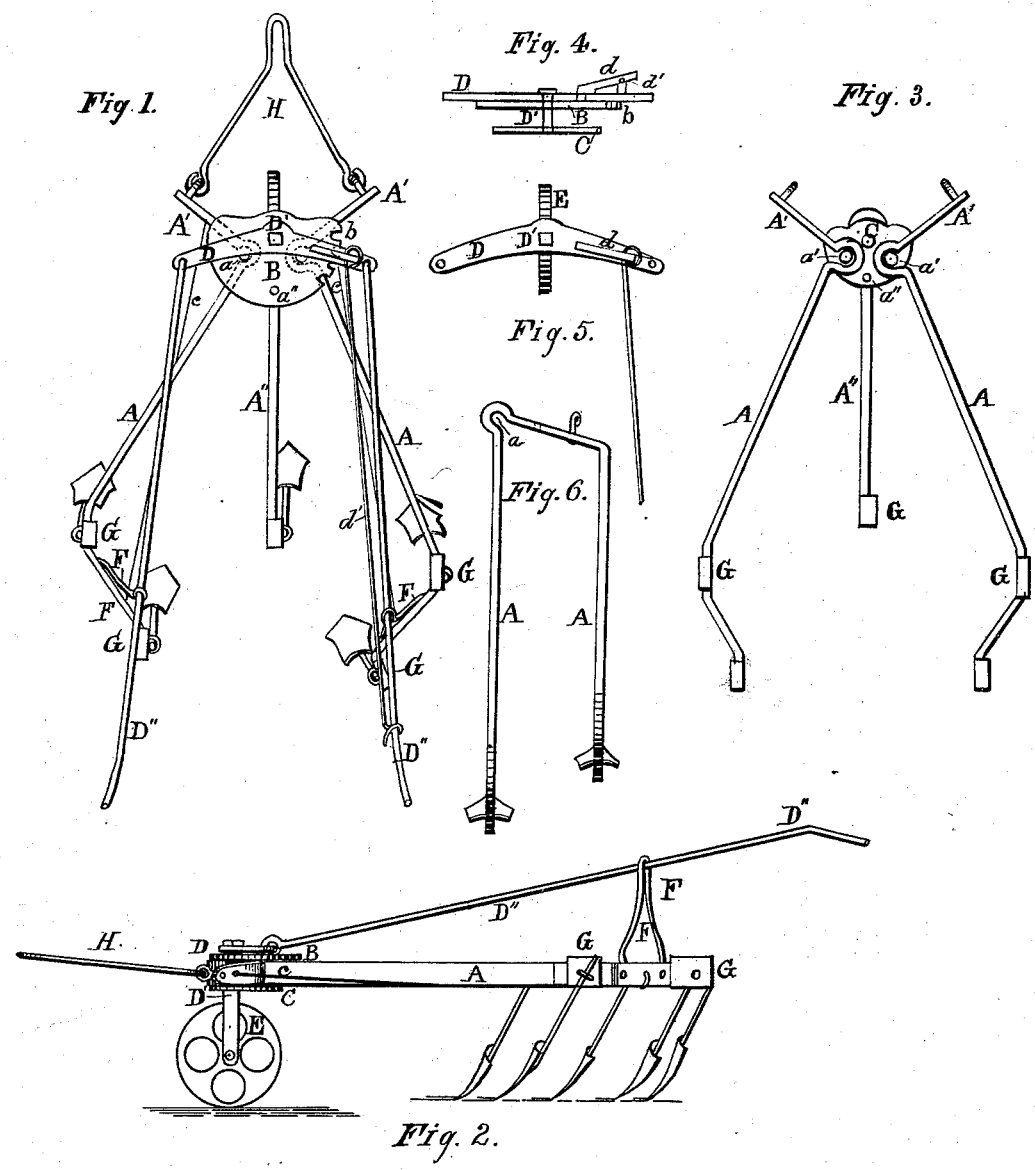

UNITED STATES PATENT OFFICE.

JOSIAH J. DEAL, OF WILMOT, OHIO.

CULTIVATOR.

SPECIFICATION forming part of Letters Patent No. 223,713, dated January 20, 1880.

Application filed September 19, 1879.

*To all whom it may concern:*

Be it known that I, JOSIAH J. DEAL, of Wilmot, in the county of Stark and State of Ohio, have invented certain Improvements in Cultivators, of which the following is a specification.

This invention relates to that class of cultivators wherein the shovel-bars are made adjustable for spreading them apart or closing them, so as to plow between wide or narrow rows, which is accomplished by means of the handles, which are operated by the attendant. The several parts to accomplish this result, as also the method of changing the direction of the cultivator, will be hereinafter more fully described.

Figure 1 is a plan view of the cultivator. Fig. 2 is a side elevation. Fig. 3 is a plan view of the two shovel-bars and under quadrant-plate. Figs. 4 and 5 are details of the steering-yoke; Fig. 6, modification of shovel-bars.

A A represent the shovel-bars, which have bent arms A' A', on the ends of which are the eyes for the draft-hook H, by which means the draft of the animal upon the bent arms will spread apart the shovel-bars A A. These bars A A are bent, with eyes at $a$, to turn on a pivot-pin, $a'$, supported by an upper quadrant-plate, B, and a lower plate, C. In the upper plate, B, are several notches, $b\ b$, for a purpose which will be presently described. Between these plates B and C is fastened permanently a straight shovel-bar, A'', by a pin, $a''$.

D is a yoke-lever fastened to the upper end of a vertical shaft, D', in the lower end of which is a wheel, E, which shaft and wheel are turned by the yoke D. In one arm of the yoke D is a slot, and pivoted therein is a pawl-bar, $d$, which falls into the notches $b$ in the plate B to retain the wheel E in any direction. This pawl $d$ is regulated by a rod, $d'$, passing from its end to the handle D'', where it is wrapped around it, so that by turning the rod the pawl $d$ can be lifted from the notches $b$ and permit the yoke D to be turned and carry with it the wheel E. The handles D'' are attached to the ends of the yoke-lever D, and are supported in standards F F on the rear ends of the shovel-bars A. Wire braces $c\ c$ extend from the arms A' A' to the rear ends of the shovel-bars A A, to stiffen and brace the shovels. On the shovel-bars, at the angles and rear ends, are the clamps G, which sustain the shanks or standards of the shovels.

By bringing the handles together the shovels on the two bars A A can be brought nearly in the same line and with the center bar, A'', so that all the shovels can be made to operate between two ridges; also, by the movement of either handle alone the direction of the wheel may be changed to the right or left, and the course of the cultivator be thereby guided when necessary.

Having thus described my invention, what I claim as novel therein, and desire to secure by a patent, is—

1. The combination of the longitudinally-sliding handles D'', the steering-bar D, having in one arm a pawl, $d$, rod $d'$, the quadrant-plate B, and vertical shaft D', carrying the wheel E, substantially as and for the purpose described.

2. The combination of the bent plow-bars A A, having eyes $a\ a$ formed therein, quadrant-plates B and C, having pivots $a'\ a'$, on which the eyes $a\ a$ are turned, substantially as and for the purpose described.

3. The combination of the shovel-bars A A and A'', the quadrant-plates B C, handles D'', yoke D, pawl $d$, vertical shaft D', and wheel E, substantially as and for the purpose described.

JOSIAH J. DEAL.

Witnesses:
GEORGE SAGER,
WM. M. JOHNSTON.